United States Patent [19]

Benedetto

[11] Patent Number: 4,728,145
[45] Date of Patent: Mar. 1, 1988

[54] CAR WITH DRIP CHANNEL AND RELATED DRIP CHANNEL COVER TRIM

[75] Inventor: Carmelo Benedetto, Milan, Italy

[73] Assignee: Alfa Romeo Auto S.p.A., Naples, Italy

[21] Appl. No.: 62,398

[22] Filed: Jun. 15, 1987

Related U.S. Application Data

[63] Continuation of Ser. No. 826,326, Feb. 5, 1986, abandoned.

[30] Foreign Application Priority Data

Feb. 19, 1985 [IT] Italy .............................. 20839/85[U]

[51] Int. Cl.4 ..................... B60R 13/02; B60R 13/07
[52] U.S. Cl. .................... 296/213; 296/208; 296/154; 296/135
[58] Field of Search ............... 296/154, 208, 213, 35, 296/206

[56] References Cited

U.S. PATENT DOCUMENTS

| | | | |
|---|---|---|---|
| 3,666,316 | 5/1972 | Wilfert | 296/213 X |
| 4,088,366 | 5/1978 | Gallitzendorfer et al. | 296/154 |
| 4,378,130 | 3/1983 | Shimizu | 296/208 |
| 4,410,211 | 10/1983 | Kloppe et al. | 296/213 |
| 4,417,762 | 11/1983 | Imai et al. | 296/213 X |
| 4,433,867 | 2/1984 | Perry et al. | 296/213 X |
| 4,452,483 | 6/1984 | Kano et al. | 296/213 |
| 4,497,516 | 2/1985 | Morita et al. | 296/206 |
| 4,508,382 | 4/1985 | Tsumoto et al. | 296/213 |
| 4,518,197 | 5/1985 | Gallitzendorfer et al. | 296/213 |
| 4,541,664 | 9/1985 | Gallitzendorfer et al. | 296/213 |

FOREIGN PATENT DOCUMENTS

| | | | |
|---|---|---|---|
| 3214876 | 11/1983 | Fed. Rep. of Germany | 296/208 |
| 2096548 | 10/1982 | United Kingdom | 296/213 |

Primary Examiner—Dennis H. Pedder
Attorney, Agent, or Firm—Charles E. Brown; Charles A. Brown

[57] ABSTRACT

Car comprising a roof and pillers, which is provided with at least one drip channel for rainwater drain and with at least one finishing trim defining a drip channel cover serving to mask joints at the roof and pillars, the roof and the pillars being provided with at least one longitudinal recess adjacent the edges thereof, on to which the finishing trim, having a side so shaped as to fit to the contour of the roof and of the pillars, is directly fastened. The trim forms, with a portion of the recess and an end mounted gasket, an outwardly open drip channel.

15 Claims, 3 Drawing Figures

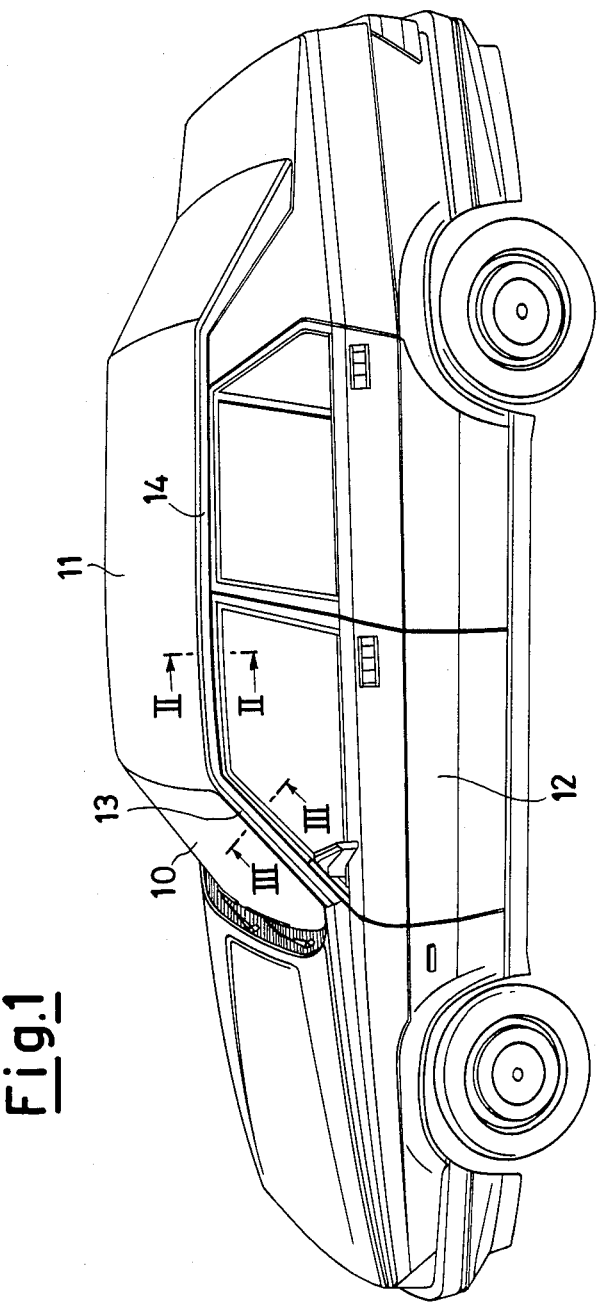

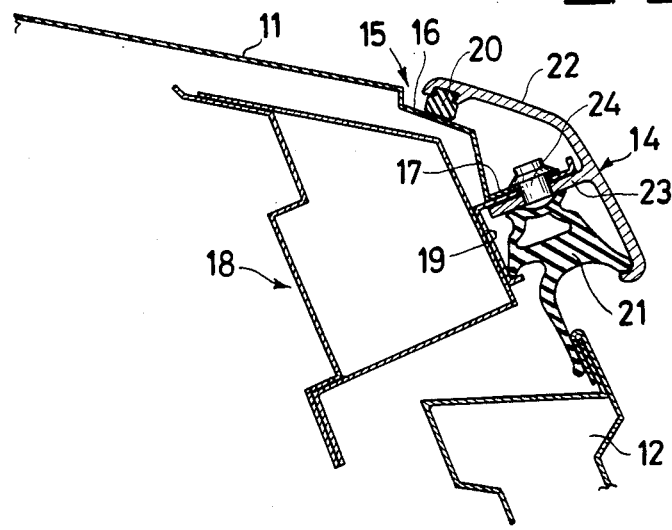
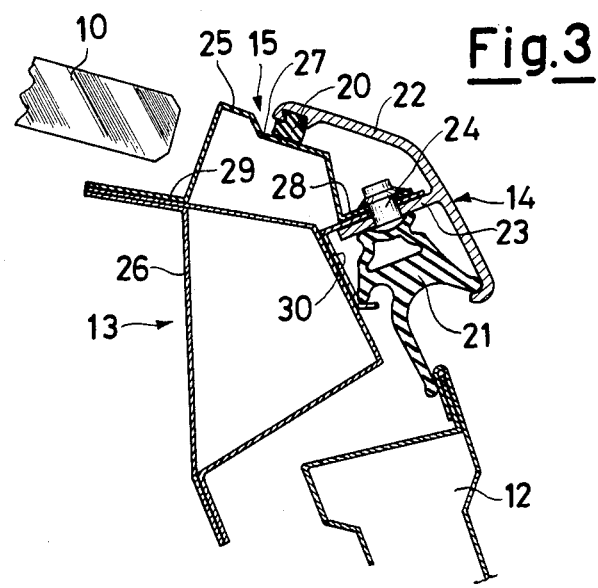

CAR WITH DRIP CHANNEL AND RELATED DRIP CHANNEL COVER TRIM

This application is a continuation of Ser. No. 826,326, filed Feb. 5, 1986, abandoned.

The present invention relates to a car comprising a roof and pillars, which is provided with at least one drip channel for rainwater drain and with at least one finishing trim defining a drip channel cover, serving to mask the joints between the parts.

In general, the drip channels are accomplished in cars by bending to a "U" shape the edges of the metal plates forming the roof and the pillars, and often on to the outer wall of the channel a trim, e.g., of chrome-plated material, is installed to finished purposes. In some cases, on to the outer wall of the "U"-shaped channel a finishing trim is applied, by means of suitable springs, serving to mask the joints between the parts, and partly covering such channel.

The first solution has the disadvantage of worsening the aerodynamic resistance coefficient ($C_x$) of the car, and its noisiness, in that it forms a projection protruding from the car's profile, and causing the formation of air vortices in the surrounding air.

The second solution results favourable from the viewpoint of the aerodynamics and of the noisiness, but it involves a certain structural complexity, in that it requires the prior assembling of the springs.

Both solutions are quite critical as for the possibility of deterioration of the material, by rust formation, because moisture stagnates easily on channels' bottom, in that they are narrow and deep and are partly covered by the strip, or by the garnish trim.

The purpose of the present invention is to provide a solution which will avoid the disadvantages of the structures as of the present art, above all as for the assembling and possibility of rust formation.

A car has been provided, wherein the roof and pillars are provided with at least one longitudinal recess provided in the walls of the roof and pillars adjacent the edges thereof, onto which a finishing trim, having a side shaped according to the profile of the roof and of the pillars, is applied.

Preferably, the recess has a step-like shape, and the trim closes the recess laterally, with an interposed sealing gasket, to form a drip channel for rainwater drain.

This solution is particularly advantageous, in that it allows providing in the bodywork a drip channel while at the same time improving the streamline and the noisiness characteristics of the car, and avoiding the stagnation of moisture, without requiring major modifications of the structure and assemblage of the roof and of the pillars.

Characteristics and advantages of the invention are now illustrated with reference to the attached drawings wherein for exemplifying, not limitative purposes, a preferred embodiment of the present invention is shown.

FIG. 1 is a lateral perspective view of a car provided with the structure which is the object of the present invention;

FIGS. 2 and 3 are enlarged fragmentary vertical section views taken generally along the line II—II and the line III—III, respectively, of FIG. 1.

In FIG. 1 there is shown a car provided with a windshield 10, a roof 11, a front door 12, a front pillar 13 and a finishing trim 14, acting as a drip channel.

A drip channel for water drain, generally indicated with 15, is visible in FIGS. 2 and 3.

An analogous drip channel 15 and an analogous trim 14 are of course provided on the other body side, not visible in FIG. 1.

As is shown in FIG. 2, the side wall of the roof 11, generally of steel plate and terminating in an edge, is provided with a longitudinal step-like shaped recess 16 adjacent an edge section of the roof bent to an "L"-shape, which edge is defined by a projecting terminal leg indicated by the numeral 17. The recess 16 is defined by a lateral wall and a transverse wall.

A girder of the roof is identified by the reference numeral 18, and having a section 19 acting as a joint between the girder 18 per se and the terminal leg 17 of the roof 11. A sealing gasket 20 is interposed between the bottom of the recess 16 and the trim 14 remote from the edge section and a dust-covering gasket 21 is interposed between the section 19, the trim 14 and the door 12 with the gasket 20 being retained in place by the section 19 and the trim 14.

The trim 14 has a side wall 22 shaped according to the profile of the roof 11, and is provided with a bracket 23, which is fastened on to the edge 17 and on to the section 19 by means of rivets 24. The gasket 20 is carried by an upper inner edge portion of the side wall 22.

As shown in FIG. 3, a drip channel 15 for water drain is also provided on the pillar 13. The pillar 13 includes a section 25, fastened on to a pilaster or girder 26, which section 25 is provided with a substantially longitudinal, step-like recess 27 disposed adjacent an edge section of the section 25 bent to an "L"-like shape and terminating in a projecting terminal leg 28.

The section 25 forms a frame 29 inside which a gasket, not shown, running along the perimeter of windshield 10, is housed.

A joint section 30 is fastened on to the terminal leg 28 of the section 25 and to the girder 26, which section 30 may be considered as forming part of the girder 26. The trim 14 has a pillar finishing trim portion including a pillar finishing trim portion side wall 22 shaped according to the contour of the section 25 to mask the edge section of the section 25 and is fastened on to the terminal leg 28 and on to the section 30 through its bracket 23, by means of rivets 24. The same gaskets 20, and 21, visible in FIG. 2, have portions which are shown with the gasket 20 portion being carried by the pillar finishing trim portion side wall 22.

As it results from the hereinabove disclosure, the drip channel 15 for rainwater drainage is formed in the roof 11 and in the pillar 13 by step-like shaped recesses, respectively 16 and 27; these recesses are laterally closed by the gasket 20, fastened on to the side wall 22 of the trim 14, which serves to mask the joints between the parts (roof 11, girder 18 and section strip 19; section strips 25 and 30, and girder 26).

The drip channel 15 could also be formed by providing "U"-shaped recesses in the wall of the roof and of the pillars.

As the drip channel 15 is not deep, and the trim 14 is provided with a side wall 22 fitting to the contour of the roof 11 and of the pillar 13, considerable advantages as for the streamline and the noisiness of the car can be obtained.

Also the assembling of the trim 14 directly on the steel plate of the roof and of the pillar, by means of the rivets 24, prior to the insertion of the dust-covering gasket 21, is very quick and reliable.

Finally, the shape of the drip channel 15, which is quite wide and not very deep, with its walls well exposed to air, results in optimized avoidance of moisture stagnations and deterioration of material such as rust forming.

I claim:

1. A car comprising a roof having side edges, said roof side edges each terminating in an edge section including a projecting terminal leg, said roof adjacent each edge section including an inwardly offset longitudinal recess, a finishing trim, said finishing trim including a side wall shaped to match the contour of the roof and a mounting bracket disposed generally parallel to said projecting terminal leg, said finishing trim being directly mounted on said terminal leg by a fastener extending through said mounting bracket and said terminal leg, said side wall overlying and masking said edge section and a portion only of said longitudinal recess, and a gasket disposed remote from said mounting bracket and positioned between an end region of said side wall and said longitudinal recess in sealed relation to said longitudinal recess to define part of said recess exteriorly of said gasket as a drip channel.

2. A car according to claim 1 wherein said gasket is carried by said side wall.

3. A car according to claim 1 wherein said longitudinal recess is defined by a generally vertical lateral wall and a generally horizontal transverse wall, and said drip channel is defined by said lateral wall, a portion only of said transverse wall and said gasket.

4. A car according to claim 1 wherein said longitudinal recess is defined by a generally vertical lateral wall and a generally horizontal transverse wall, and said transverse wall terminates in said edge section.

5. A car according to claim 1 wherein said longitudinal recess is defined by a generally vertical lateral wall and a generally horizontal transverse wall, and said transverse wall terminates in said edge section which is L-shaped.

6. A car according to claim 1 wherein there is a roof girder lying adjacent said roof edge section, and said fastener securing said finishing trim, said terminal leg and said girder together.

7. A car according to claim 1 wherein there is a roof girder lying adjacent said roof edge section and generally within said finishing trim, and a dust gasket for a car door seated between said side wall and said girder independent of said fastener.

8. A car according to claim 1 wherein said roof has pillars, at least certain of said pillars has a side edge terminating in an edge section including a projecting terminal leg, each said certain pillar adjacent said pillar edge section having an inwardly offset pillar longitudinal recess, a pillar finishing trim portion secured directly to said pillar terminal leg, said pillar finishing trim portion including a pillar finishing trim portion side wall shaped to generally match the contour of said pillar, said pillar finishing trim portion side wall overlying and masking said pillar edge section and a portion of said pillar longitudinal recess, and a gasket portion positioned between said pillar finishing trim portion side wall and said pillar longitudinal recess in sealed relation to said pillar longitudinal recess to define a part only of said pillar longitudinal recess remote from said pillar side edge section as a drip channel.

9. A car comprising a roof and pillars, at least certain of said pillars having a side edge terminating in an edge section including a projecting terminal leg, each said certain pillar adjacent said pillar edge section having an inwardly offset longitudinal recess, a pillar finishing trim portion secured directly to said pillar terminal leg, said pillar finishing trim portion including a pillar finishing trim portion side wall shaped to match the contour of said pillar, said pillar finishing trim portion side wall overlying and masking said pillar edge section and a portion of said pillar longitudinal recess, and a gasket positioned between an end region of said pillar finishing trim portion side wall and said pillar longitudinal recess in sealed relation to said pillar longitudinal recess to define part only of said pillar longitudinal recess exteriorly of said gasket as a drip channel.

10. A car according to claim 9 wherein said gasket is carried by said pillar finishing trim portion side wall.

11. A car according to claim 9 wherein said pillar longitudinal recess is defined by an inwardly projecting lateral wall and a recessed transverse wall, and said drip channel is defined by said lateral wall, a portion only of said transverse wall and said gasket.

12. A car according to claim 9 wherein said pillar longitudinal recess is defined by an inwardly projecting lateral wall and a recessed transverse wall, and said recessed transverse wall terminates in said pillar edge section.

13. A car according to claim 9 wherein said pillar longitudinal recess is defined by an inwardly projecting lateral wall and a recessed transverse wall, and said recessed transverse wall terminates in said pillar edge section which is L-shaped.

14. A car according to claim 9 wherein there is a girder positioned adjacent said pillar edge section, and a fastener securing said pillar finishing trim portion, said pillar terminal leg and said girder together.

15. A car according to claim 9 wherein there is a girder positioned adjacent said pillar edge section and generally within said pillar finishing trim portion, and a dust gasket for a car door seated between said pillar finishing trim portion side wall and said girder.

* * * * *